United States Patent
Weir

(10) Patent No.: US 8,819,723 B1
(45) Date of Patent: Aug. 26, 2014

(54) SYSTEM AND METHOD FOR BROKERING AUXILIARY DATA BROADCASTING SERVICES

(75) Inventor: Earline M. Weir, Manhattan Beach, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 916 days.

(21) Appl. No.: 09/559,372

(22) Filed: Apr. 27, 2000

(51) Int. Cl.
| | |
|---|---|
| H04N 7/10 | (2006.01) |
| H04N 7/025 | (2006.01) |
| H04N 7/081 | (2006.01) |
| H04N 21/262 | (2011.01) |
| H04N 21/2343 | (2011.01) |
| H04N 21/234 | (2011.01) |
| H04N 7/26 | (2006.01) |
| H04N 21/2389 | (2011.01) |

(52) U.S. Cl.
CPC ........ *H04N 21/262* (2013.01); *H04N 19/00557* (2013.01); *H04N 21/23892* (2013.01); *H04N 7/26372* (2013.01); *H04N 21/234354* (2013.01); *H04N 21/234* (2013.01); *H04N 21/2343* (2013.01); *H04N 21/23424* (2013.01)
USPC ................. 725/32; 725/33; 725/35; 725/136; 725/135; 348/473

(58) Field of Classification Search
USPC ......... 725/1, 4, 5, 114, 116, 144, 146, 32, 36, 725/136; 348/563; 709/100, 102
See application file for complete search history.

(56) References Cited

U.S. PATENT DOCUMENTS

| | | | |
|---|---|---|---|
| 4,216,500 A | 8/1980 | St. Louis | 380/7 |
| 4,399,554 A | 8/1983 | Perkins, III et al. | 382/141 |
| 4,546,433 A | 10/1985 | Tucker | 382/308 |
| 4,700,294 A | 10/1987 | Haynes | 364/200 |
| 4,718,104 A | 1/1988 | Anderson | 382/240 |
| 4,742,552 A | 5/1988 | Andrews | 382/308 |
| 4,776,029 A | 10/1988 | Shimura | 382/251 |
| 4,780,718 A | 10/1988 | Hudson et al. | 342/25 |
| 4,817,174 A | 3/1989 | Nakatani | 382/266 |
| 4,829,378 A | 5/1989 | LeGall | 382/248 |
| 4,949,381 A | 8/1990 | Pastor | 380/54 |
| 4,951,139 A * | 8/1990 | Hamilton et al. | 375/240.07 |
| 5,065,446 A | 11/1991 | Suzuki et al. | 382/56 |
| 5,070,402 A | 12/1991 | Ishii et al. | 358/135 |
| 5,093,871 A | 3/1992 | Klein et al. | 382/172 |

(Continued)

OTHER PUBLICATIONS

Fridrich, "Applications of Data Hiding in Digital Images", Nov. 4-6, 1998.*

(Continued)

*Primary Examiner* — Pankaj Kumar
*Assistant Examiner* — Usha Raman

(57) ABSTRACT

A method and apparatus for brokering data embedding services. The method comprises the steps of receiving a request in an embedded data brokering system to embed the auxiliary data in the media program, determining if the auxiliary data may be embedded into the media program, negotiating a schedule for broadcasting the media program with embedded auxiliary data with the media program provider, transmitting the negotiated schedule for broadcasting the media program with the embedded auxiliary data to the media program provider, steganographically embedding the auxiliary data in the media program while collecting billing information regarding the embedded data, and providing the media program and the embedded auxiliary data to the media program services subscriber for broadcast according to the broadcast schedule.

15 Claims, 11 Drawing Sheets

(56) References Cited

U.S. PATENT DOCUMENTS

| | | | | |
|---|---|---|---|---|
| 5,187,755 | A | | 2/1993 | Aragaki ................ 382/250 |
| 5,343,554 | A | | 8/1994 | Koza et al. ............... 395/13 |
| 5,412,200 | A | | 5/1995 | Rhoads ................ 356/121 |
| 5,422,964 | A | | 6/1995 | Devimeux et al. ........... 382/266 |
| 5,432,870 | A | | 7/1995 | Schwartz ............... 382/232 |
| 5,491,761 | A | | 2/1996 | Kim ................... 382/254 |
| 5,615,287 | A | | 3/1997 | Fu et al. ................ 382/232 |
| 5,703,965 | A | | 12/1997 | Fu et al. ................ 382/232 |
| 5,717,787 | A | | 2/1998 | Feo et al. ............... 382/232 |
| 5,727,092 | A | | 3/1998 | Sanford, II et al. ........ 382/251 |
| 5,809,201 | A | * | 9/1998 | Nagasawa ............... 386/68 |
| 6,026,193 | A | * | 2/2000 | Rhoads ................ 382/232 |
| 6,226,387 | B1 | * | 5/2001 | Tewfik et al. ............ 382/100 |
| 6,285,774 | B1 | * | 9/2001 | Schumann et al. ......... 382/100 |
| 6,459,427 | B1 | * | 10/2002 | Mao et al. .............. 725/109 |
| 6,463,585 | B1 | * | 10/2002 | Hendricks et al. .......... 725/35 |
| 6,698,020 | B1 | * | 2/2004 | Zigmond et al. ........... 725/34 |
| 6,704,930 | B1 | * | 3/2004 | Eldering et al. ............ 725/36 |
| 6,745,237 | B1 | * | 6/2004 | Garrity et al. ............ 709/219 |
| 6,748,362 | B1 | * | 6/2004 | Meyer et al. ............. 704/500 |
| 6,820,277 | B1 | * | 11/2004 | Eldering et al. ........... 725/35 |
| 7,188,186 | B1 | * | 3/2007 | Meyer et al. ............. 709/231 |
| 2001/0047294 | A1 | * | 11/2001 | Rothschild .............. 705/14 |
| 2004/0210944 | A1 | * | 10/2004 | Brassil et al. ............ 725/135 |
| 2004/0261125 | A1 | * | 12/2004 | Ellis et al. .............. 725/133 |

OTHER PUBLICATIONS

Definition of "Suitable" from "The American Heritage College Dictionary", Houghton Mifflin, 4th edition.*

Roget's New Millennium Thesaurus, entry for "suitable" (http://thesaurus.reference.com/browse/suitable).*

Rothschild, Anothny, "Brandmail Network", U.S. Appl. No. 60,174,781, filed Jan. 6, 2000.*

Swanson et al., "Multiresolution Scene-Based Video Watermarking Using Perceptual Models", May 1998, IEEE Journal on Selected Areas in Communications, vol. 16, No. 4, pp. 540-550.*

Antonini, Marc, et al., "Image Coding Using Wavelet Transform", IEEE Transactions on Image Processing (1992), vol. 1, No. 2, pp. 205-220.

C-Cube Microsystems, "JPEG Algorithm Overview" (Sep. 1992).

Carlsson, Stefan, et al., "Sketch Based Representation of Grey Value and Motion Information", From Pixels to Features, Proceedings of a Workshop (1989), pp. 27-39.

Carlsson, Stefan, "Sketch Based Coding of Grey Level Images", Signal Processing (1988), North Holland, vol. 15, pp. 87-83.

DeNatale, F., et al., "A Spline-Like Scheme for Least-Squares Bilinear Interpolation of Images", IEEE (1993), pp. V-141-V-144.

DeVore, Ronald A., et al., "Image Compression Through Wavelet Transform Coding", IEEE Transactions on Information Theory (Mar. 1992), vol. 38, No. 2, pp. 719-746.

Farvardin, et al., "Adaptive Coding of Images Using Entropy-Constrained Trellis Coded Quantization", IEEE International Conference on Acoustics, Speech and Signal Processing (1993), vol. 5, pp. V-397-V-400.

Kunt, Murat, et al., "Recent Results in High-Compression Image Coding", IEEE Transactions on Circuits and Systems (1987), vol. CAS-34(11), pp. 1306-1336.

PHADE Software, "The MPEG-FAQ", Version 3.1 (May 14, 1994).

Press, William H., et al., "Numerical Recipes in C, The Art of Scientific Computing", Cambridge University Press (1992), $2^{nd}$ ed.

Purcell, Stephen C. "The C-Cube CL550 JPEG Image Compression Processor", C-Cube Microsystems, Inc. (1992).

Ran, X and Farvardin, N., "Adaptive DCT Image Coding Based on a Three-Component Image Model", 1992 IEEE International Conference on Acoustics, Speech and Signal Processing (1992), vol. 3, pp. III-201-III-204.

Ran X., Ph. D., "A three-component image model based on human visual perception and its applications in image coding and processing", UMI Dissertation Services (1992).

Razavi, Abbas, et al., "A Low Cost Still Picture Compression Chip Set", SPIE Processing and Interchange (1992), vol. 1659, pp. 41-46.

Schuster, Rolf, et al., "A Hierarchical Edge Detector Using the First and Second Derivative Operators", SPIE, Intelligent Robots and Computer Vision XI (1992), vol. 1825, pp. 230-241.

Wallace, Gregory K., "The JPEG Still Picture Compression Standard", IEEE Wallace, Gregory Transactions on Consumer Electronics (1992), vol. 38, No. 1, pp. xviii-xxxiv.

Zoran Corporation, "JPEG Image Coder/Decoder", Preliminary Data Sheet (Aug. 1992).

Zoran Corporation, "Discrete Cosine Transform (DCT) Processor", Data Sheet (Jul. 1992).

Zoran Corporation, "040 JPEG Image Compression Chip Set", Product Brief (Jun. 1992).

Zoran Corporation, "Image Compression Coder/Decoder", Preliminary Data Sheet (Jan. 1992).

Zoran Corporation, "Motion Video Compression System Design with the Zoran 040 JPEG Image Compression Chip Set", Technical Note (Nov. 1992), pp. 1-26.

Yang et al., "Regularized reconstruction to reduce blocking artifacts of black discrete costume transform compressed images" IEEE Trans. Circuits Syst. Video Technol., vol. 3, No. 6, pp. 421-432, Dec. 1993.

* cited by examiner

SYSTEM AND METHOD FOR BROKERING AUXILIARY DATA BROADCASTING SERVICES

BACKGROUND OF THE INVENTION

1. Field of the Invention

The present invention relates to systems and methods for transmitting media programs and other data to subscribers, and in particular to a system and method for providing a auxiliary data broadcasting service.

2. Description of Related Art

Television, audio, and other media programs can be distributed to viewers by a variety of broadcasting methods. These methods include traditional analog broadcast television, the upcoming digital broadcast television, cable television (both analog and digital), satellite broadcasting (both analog and digital), as well as other methods. These methods allow channels to be multiplexed and transmitted over a common transmission medium.

Advances in data compression techniques, including those developed by the joint photographic experts group (JPEG), the motion pictures experts group (MPEG), and others, have permitted more and more data to be broadcast without increasing the bandwidth of the broadcast link. JPEG is an ISO/ITU standard for compressing still images that uses discrete cosine transform (DCT). JPEG provides lossy compression with ratios up to 100:1 and higher. Depending on the image complexity, ratios of 10:1 to 20:1 often provide little or no noticeable loss in image quality. Compression is achieved by dividing the picture into tiny pixel blocks, which are halved over and over until the ratio is achieved. MPEG uses the same intraframe coding as JPEG for individual frames, but also uses interframe coding, which further compresses the video data by encoding only the differences between periodic key frames, known as I-frames.

In recent years, techniques have been developed which allow auxiliary data to be embedded into such media programs without materially affecting the perceived quality of the received media program. One such technique, referred to as steganography, is well known, and is described in the following patents, which are hereby incorporated by reference: U.S. Pat. No. 5,727,092, issued Mar. 10, 1998 to Maxwell T. Sandford II et al. for "Compression Embedding"; U.S. Pat. No. 5,778,102, issued Jul. 7, 1998 to Maxwell T. Sandford II et al. for "Compression Embedding"; and U.S. Pat. No. 5,659,726, issued Aug. 19, 1997 to Maxwell T. Sandford II et al. for "Data Embedding."

While steganographic techniques are useful, they are not as widely applied as their advantages would suggest. One difficulty with the application of steganographic techniques revolves around conflicts between the ownership and control of the media programs, the auxiliary data to be embedded, and the broadcast channels used to transmit the data. Media program providers are often reluctant to allow data of unknown or uncontrolled origin to be embedded into media programs. This is due to fears of degraded picture quality and exposure to liability for the embedded data. At the same time, auxiliary data providers are often reluctant to allow their data to be broadcast by media program providers, and do not have the infrastructure required to indicate to their subscribers when the data will be received. Further, the auxiliary data provided by third parties may include time-sensitive information, which must be provided with a minimum latency or according to a minimum guaranteed quality of service level (QoS). What is needed is a system and method that provides a brokering service between media program providers, broadcasters, and auxiliary data providers. The present invention satisfies that need.

SUMMARY OF THE INVENTION

To address the requirements described above, the present invention discloses a method, apparatus, article of manufacture, and a memory structure for brokering the transmission of embedded auxiliary data on a media program.

The method comprises the steps of receiving a request in an embedded data brokering system to embed the auxiliary data in the media program, determining if the auxiliary data may be embedded into the media program, negotiating a schedule for broadcasting the media program with embedded auxiliary data with the media program provider, transmitting the negotiated schedule for broadcasting the media program with the embedded auxiliary data to the media program provider, steganographically embedding the auxiliary data in the media program while collecting billing information regarding the embedded data, and providing the media program and the embedded auxiliary data to the media program services subscriber for broadcast according to the broadcast schedule.

The apparatus comprises a system for transmitting auxiliary data embedded into a media program to at least one media program service subscriber. The apparatus comprises a data embedding system, for accepting the auxiliary data provided by an auxiliary data provider and for steganographically embedding the auxiliary data into the media program data, a broadcast management system, communicatively coupled to the data embedding system for commanding the data embedding system to steganographically embed the auxiliary data into the media program data, and for collecting billing information regarding the embedded auxiliary data, a broadcast scheduling system, communicatively coupled to the broadcast management system and the data embedding system, for maintaining media program broadcast schedules from media broadcast service providers, for scheduling when the auxiliary data is to be transmitted with the media program data, and for determining when the auxiliary data may be embedded into the media program data.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention describes a system and method for providing a brokering service that uses the techniques of steganography to expand the amount of available bandwidth for satellite and other wideband broadcasters. It allows wideband data distributors to serve two sets of clients with one data stream or to increase the information flow for one user. The present invention enables commercial satellite-based broadcast services with Ku-band coverage over the continental U.S. (such as digital satellite television services) to augment their broadcasts with related information or to send completely unrelated information to a different user. The present invention supports similar services that are available world wide in both Ku- and C-band. The present invention allows these broadband broadcast services to provide the capability to transmit other data text files or static images to a large number of users at minimal cost.

The present invention can augment military and commercial satellite broadcast services to take advantage of any excess bandwidth in the digitized video data stream. Auxiliary data can be embedded on lively media programs (for example, video images that contain numerous edges and ample movement) without any substantial degradation in quality using steganographic techniques. The auxiliary data can include text, other images, training materials, descriptive text (or audio), and may be related or unrelated to the media program it is embedded within. The disclosed embodiment allows commercial digital video broadcasters to send additional information in video or still images. The present invention is also applicable to audio streams, and does not impact the current use of blanking bits in FM broadcasts. Embedded messages are not detectable to existing receivers and do not adversely affect the broadcast data. The present invention describes a system and method which can accept media programs and auxiliary data, determine when and under which conditions auxiliary data may be embedded in the media programs, and manages the data embedding process.

Figure 1:
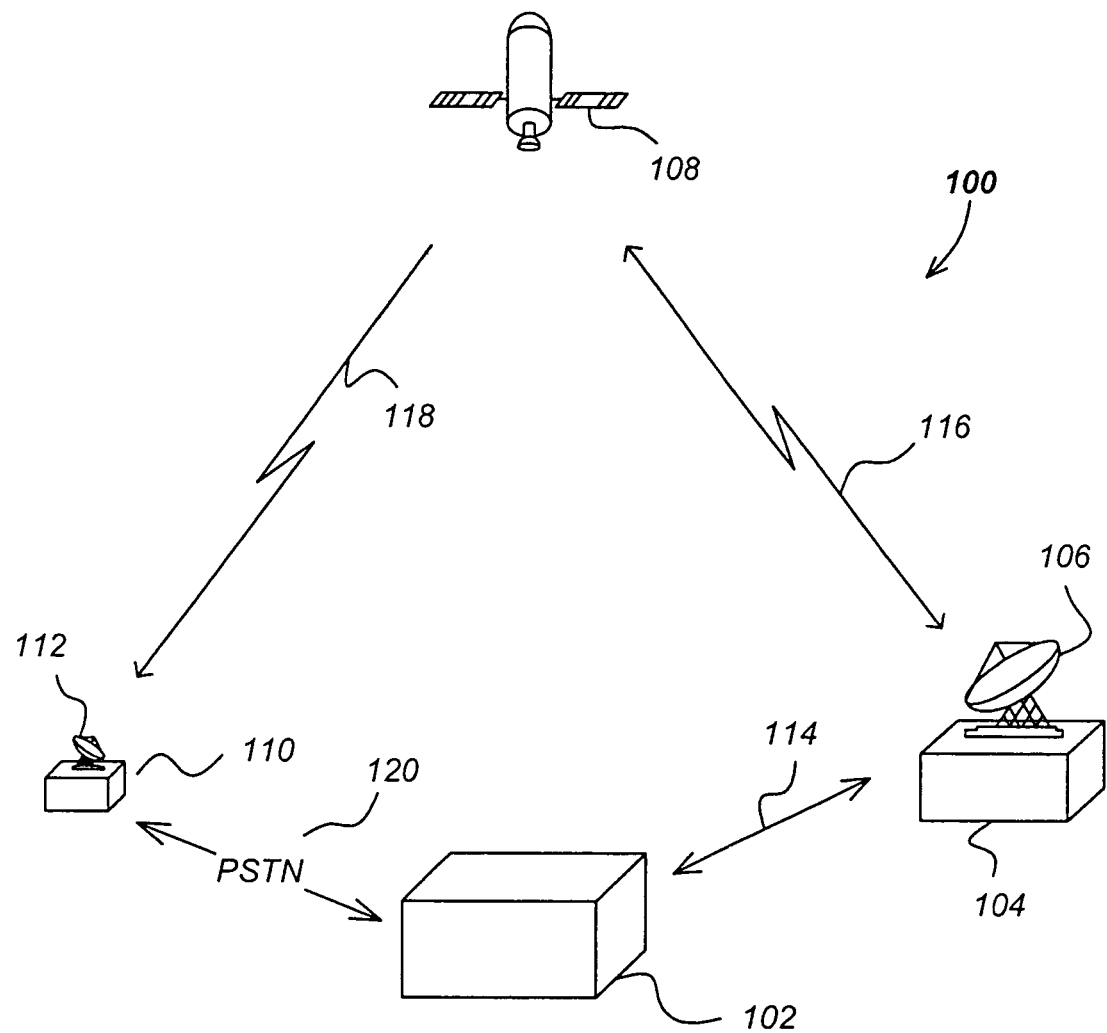
FIG. 1 is a diagram illustrating an overview of one embodiment of the media program broadcasting system.

FIG. 1 is a diagram illustrating an overview of one embodiment of the media program broadcasting system 100. The media broadcasting system 100 is operated by a media broadcaster to transmit media programs and other information to subscribers.

The media broadcasting system 100 comprises a control center 102 in communication with an uplink center 104 via a ground link 114 and with a subscriber 110 via a public switched telephone network (PSTN) or other link 120. The control center 102 provides program material to the uplink center 104, coordinates with the subscribers 110 to offer pay-per-view (PPV) program services, including billing and associated decryption of video programs.

The uplink center receives program material and program control information from the control center 102, and using an uplink antenna 106, transmits the program material and program control information to the satellite 108. The satellite receives and processes this information, and transmits the video programs and control information to the subscriber via downlink 118. The subscriber 110 receives this information using the subscriber antenna 112.

The video distribution system 100 can comprise a plurality transport media such as satellites 108 in order to provide wider terrestrial coverage, to provide additional channels, or to provide additional bandwidth per channel. The video distribution 100 may also comprise other transport media such as airborne flying vehicles or stratospheric platforms or other such structures alone or in combination with the satellites 108. For convenience, these structures are referred to hereinafter as "satellites," but should be understood to encompass a variety of transport media. In one embodiment of the invention, each satellite comprises 16 transponders to receive and transmit program material and other control data from the uplink center 104 and provide it to the subscribers 110. However, the channel capabilities are far greater when data compression and multiplexing techniques are used. For example, two-satellites 108 working together can receive and broadcast over 150 conventional (non-HDTV) audio and video channels via 32 transponders.

While the invention disclosed herein will be described with reference to a satellite based video distribution system 100, the present invention may also be practiced with terrestrial-based transmission of program information, whether by broadcasting means, cable, stratospheric or airborne elements, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber is video (and audio) program material such as a movie, the foregoing method can be used to deliver program material comprising purely audio information as well.

Figure 2:
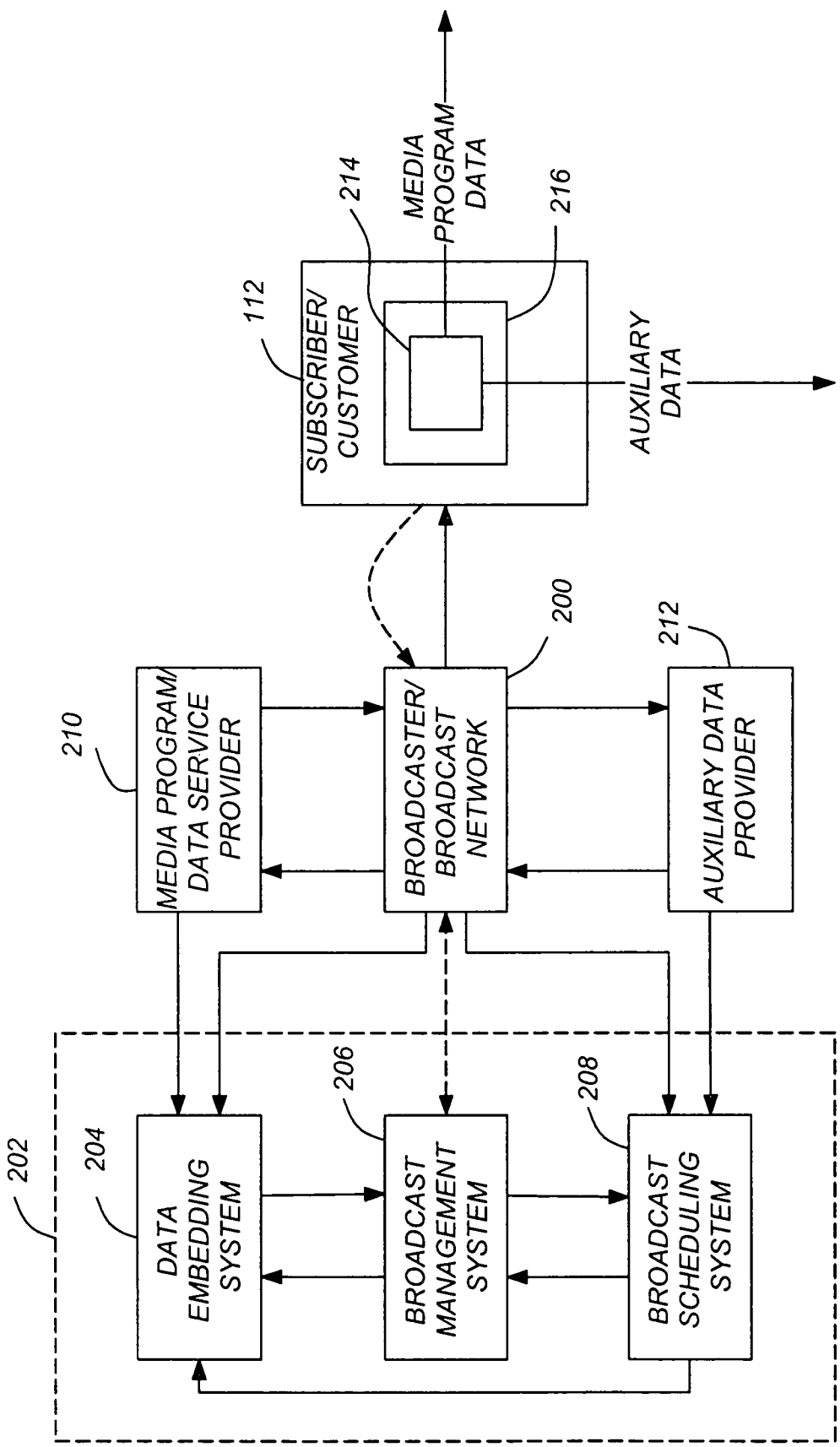
FIG. 2 is a block diagram of the embedded data brokering system 202 and related components.

FIG. 2 is a block diagram of the embedded data brokering system 202 and related components. The Embedded Data Brokering System (EDBS) 202 includes a data embedding system 204, a communicatively coupled broadcast management system 206 and broadcast scheduling system 208. The data embedding system 204 includes the hardware, firmware, and software to accept auxiliary data, and to embed the auxiliary data in media program data. In one embodiment, this is accomplished via steganographic techniques set forth more fully below.

The broadcast management scheduling system 206 accepts requests and parameters (including the terms and conditions for embedding data) from broadcasters 200 having access to a media program broadcasting system 100, media program providers 210, embedded data providers 212, or any combination thereof. This information is used to determine when a media program is suitable for embedding data, and transmits the data to be embedded to the data embedding system 204. The broadcast management scheduling system 206 also determines which of the media programs will include the embedded data, when the media programs and embedded data will be broadcast, and communicates this information to the broadcast management system 206. The broadcast management system controls the data embedding system 204, and interfaces with the broadcast scheduling system 208 and the data embedding system 204 to provide information generated by the data embedding system and the broadcast scheduling system 208 to the broadcaster 100.

As described above, the data embedding system 204 embeds data into the media programs. The embedding technique preserves entropy in the lossy compression of the discrete cosign transform (DCT) that is the first step in Joint Photographic Experts Group (JPEG) and Motion Picture Experts Group (MPEG) compression. The video image is broadcast with the embedded digital data as it is normally broadcast, thus providing additional bandwidth for broadcast services.

Since all MPEG and Digital Video Broadcast (DVB) systems (the European standard for video compression) use JPEG compression discrete cosine transforms (DCT) as the first step, the technique is easily transferred to MPEG and DVB compression. Therefore it is applicable to wide band video systems used worldwide.

The most common DCT transforms of a given image are associated with an alphabet. An embedding key which describes an association between the DCT and an alphabet used in the DCT process, is generated before the broadcast. This embedding key is retrieved at the subscriber's receiver or set top box and used to extract the embedded auxiliary data.

In one embodiment of the present invention, the embedding key is stored on an MPEG 8-16 bit control word that is currently not used in standard MPEG nor in DVB systems) before transmission to the subscriber's receiver 214. The embedding key can also be stored in one or more corner pixels in the video frame (e.g. the first pixel in the video frame). The association may be for ones and zeroes or for a much more complicated alphabet.

At the subscriber site 112, a receiver 214 having an embedded data decoder 216 accepts the compressed MPEG image data and retrieves the digital data from it. Receivers 214 without embedded data decoders 216 receive the signal normally, as if the data embedding process had not occurred.

The foregoing provides additional bandwidth by embedding data in a video stream. This permits the broadcast of either related or unrelated digital data and video or audio data in the same data stream, effectively expanding the available bandwidth. In the alternative, the additional bandwidth can be sold to those who wish to broadcast data to a large number of users. This increases the spectrum available to broadcasters and auxiliary data providers without building new distribution systems, requiring new and expanded capabilities.

The present invention provides services to at least two user classes. The first user class comprises those who wish to broadcast supplementary data regarding the media programs as auxiliary data. For example, sports media programs can be improved by including statistics and historical information about a game or player in a small text box that does not interfere with the viewing of the game. Cooking shows and demonstrations may benefit by providing recipes in a text box that users could copy while the demonstrations are proceeding. The uses by broadcasters are many and in most cases will improve the subscriber's experience. The present invention provides the capability of adding information either in text or related images to any kind of broadcast with archival or other data services from service providers 210. The second major user class comprises third party embedded data providers 212.

Such third party embedded data providers 212 wish to broadcast data unrelated to the media program hosting the data to a wide audience. The second user class, may include, for example, Government agencies like the Department of Agriculture (crop forecasts), Department of Commerce (weather), Department of Defense (training materials) or commercial entities like banks (financial transactions and data), stock markets (trading data) and retailers (transaction data, stock on hand, and payroll data). Embedded data services can be used during peak demand times to supplement other data delivery systems and techniques to ameliorate congestion. For this second class of users, pricing structures can be defined that account for the fact that peak demand hours may be oversubscribed.

Other commercial applications include those which are described in Table 1, below:

TABLE 1

| User Class | Commercial Applications |
| --- | --- |
| Banks and Lending Institutions | Data to sites: Changes in regulatory information, changes in operations, general information transfers from main office to branches.<br>Data to general public: Interest rate changes, services provided, bank locations and operating hours, advertisements |
| Large Corporations | Data to sites: Digital music, operations changes, changes in pricing and ordering procedures, transportation and other logistics changes<br>Data to general public:Digital music, services and product descriptions, services provided, pricing changes, special offers, location of retail establishments, catalogues |
| Radio and TV Stations | Data to sites: Digital music, breaking news stories, traffic and weather changes, financial information, new advertisements, statistics and sports lore in sports broadcasts<br>Data to general public: Digital music, breaking news stories, traffic and weather changes, financial information, program guides |
| Education Institutions | Data to sites: Class time, location availability, operational changes, staffing and organizational changes, fee changes, billing and other financial information<br>Data to general public: Class time, locations and availability, fee changes, new publications, shows and theatrical presentations time, cost and locations, sports events times and locations, publications |
| Stock Market | Data to sites: Ticker tape data, volume<br>Data to general public: Ticker tape data, volume |
| TV Stations | Data to general public: Statistics, history, information relating to the broadcast<br>Data to sites: Statistics, history and information relating to broadcast |

The present invention can be advantageously applied to digital satellite television (DSAT) or any broadcasting system that transmits digitized video or audio data. It is also applicable to cable, fiber, over the air terrestrial and ground wireless providers of broadband data or digitized audio signals. Using the same techniques, data may be embedded in the audio signal, with little effect on the resulting audio signal.

In the following discussion, reference is made to "media programs," "media service providers," "auxiliary data providers," and "broadcasters." "Media programs" include movies, television shows, music, video games and the like which comprise media program data. Media providers include purveyors of media programs, such as HBO, or CINEMAX. The media programs offered by the media providers can include media programs to which the media provider has exclusive rights, or media programs which the media provider licenses from other media providers such as METRO-GOLDWYN-MAYER. "Broadcasters" include entities that broadcast or transmit the media programs and other data to media program subscribers. Broadcasters include, for example, traditional broadcasters such as the AMERICAN BROADCASTING COMPANY, satellite broadcasters such as DIRECTV, cable TV providers, or Internet portals. "Auxiliary data providers" include other entities having data that they want to disseminate to the public. Hence, an "auxiliary data provider" could include (1) a software company seeking to provide software modules to customers, (2) the Department of Agriculture, seeking to provide crop data to local farmers, or (3) a media provider, seeking to augment the media program with data that is either related or unrelated to the media program(s). As used herein, a media program service subscriber" includes any entity which can receive data from a broadcaster. Typically, such entities are have pre-arranged for reception of the data from the broadcaster, however, this need not be the case.

Figure 3:
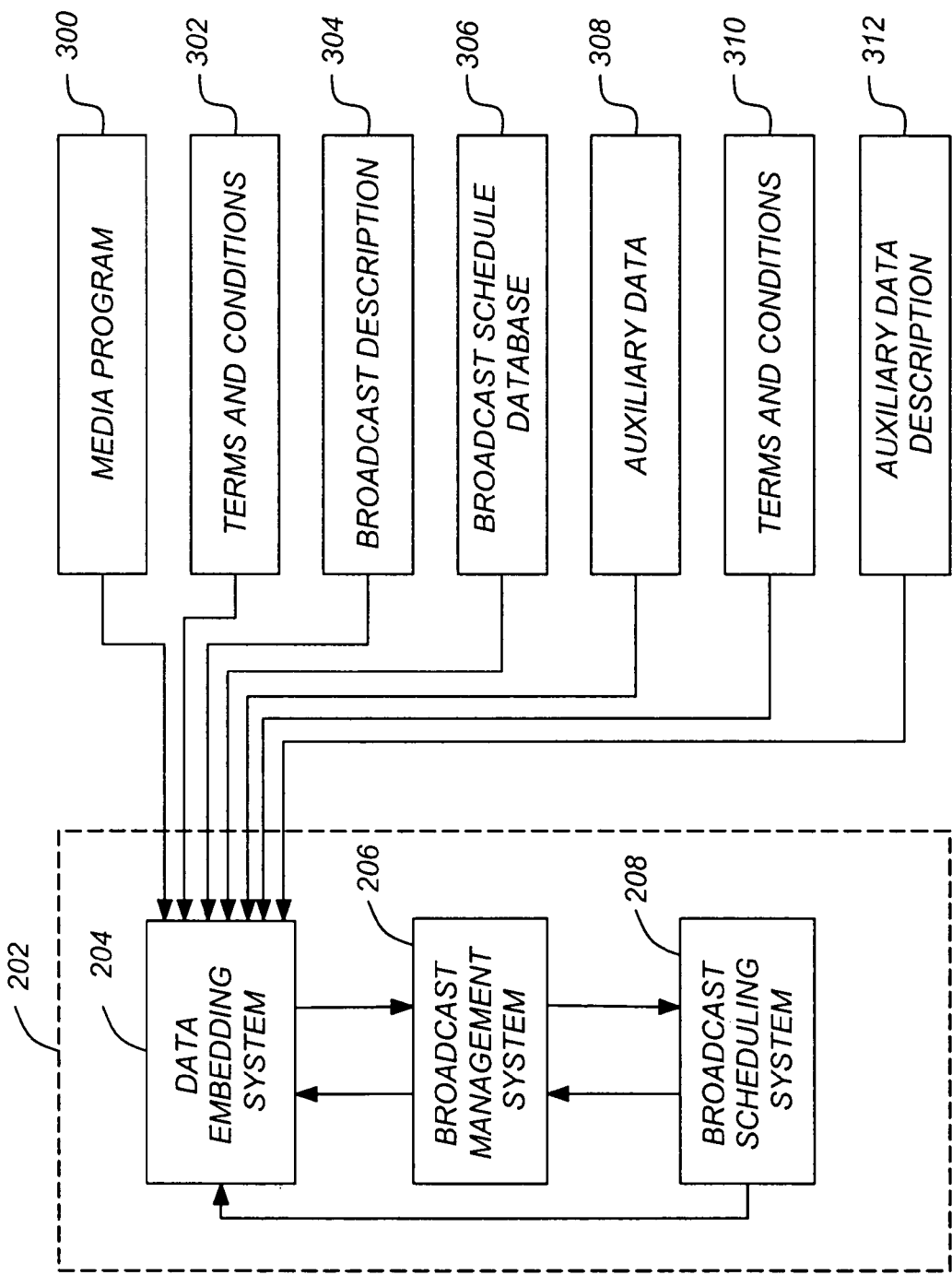
FIG. 3 is a diagram presenting an overview of the embedding of data into a media program.

FIG. 3 is a diagram presenting an overview of the embedding of data into a media program. The data embedding system 204 can be disposed at the broadcast center of the EDBS 202 or at the broadcaster 200.

The time of the broadcast is determined by the broadcast center scheduling system 208 in concert with the broadcaster 200. The terms and conditions 302, under which the EDBS 202 is permitted to embed data in a media program 300 for broadcast are negotiated with the broadcaster 200.

Typically, the terms and conditions for data embedding are set by the media provider. These terms can be arrived at by negotiation between the broadcast management system 206 and the media providers. In many cases, although a media program may be suitable for data embedding, terms and conditions may preclude the use of that media program for data embedding. These terms and/or conditions may limit, for example, when auxiliary data can be embedded, what category of auxiliary data can be embedded, the bandwidth of the embedded data, the source of the embedded data, or the category of the media program. Media program providers may have obtained rights to a particular media program via a license which forbids data embedding.

The broadcaster 200 may provide a transmit-ready media program 300 that has already been compressed using MPEG or DVB compression or the video may be transmitted uncompressed, and compressed at the EDBS 202.

Not all broadcasts are suitable for data embedding. For example, cartoons and other video programs with large areas of constant intensity and few edges are not good candidates for embedding. Football games, with lively action and small areas of constant intensity are generally good candidates. To aid in a determination of the suitability of a particular media program for data embedding, a description of the broadcast 304 may be provided to EDBS 202. Alternatively the EDBS 202 can perform an analysis of the media program to determine suitability for data embedding, with or without the broadcast description 304. This information can also be used to determine the amount (and bandwidth) of data that can be embedded and ultimately broadcast, and to determine at least one parameter of the cost that will be billed to the broadcaster 200 or embedded data provider 212 for data embedding services. This cost and bandwidth information can then be transmitted from the EDBS 202 to the embedded data provider 212, broadcaster 200 or media program provider 210. Similarly, the terms and conditions 310 related to the use of the auxiliary data 308 and an auxiliary data description 312 are provided for the same purpose.

Use of data embedding may also depend on the broadcast schedule and the kind of broadcast. Broadcast schedules of unrelated data can be published with the broadcast scheduling system 208 and the broadcast management system 206. This is particularly useful in cases where the auxiliary data is unrelated to the media program.

Each of the data items shown in blocks 300-312 may be provided to the EDBS 202 by the media program provider 210, the broadcaster 200 or the auxiliary data provider 212, or any combination thereof.

Figure 4:
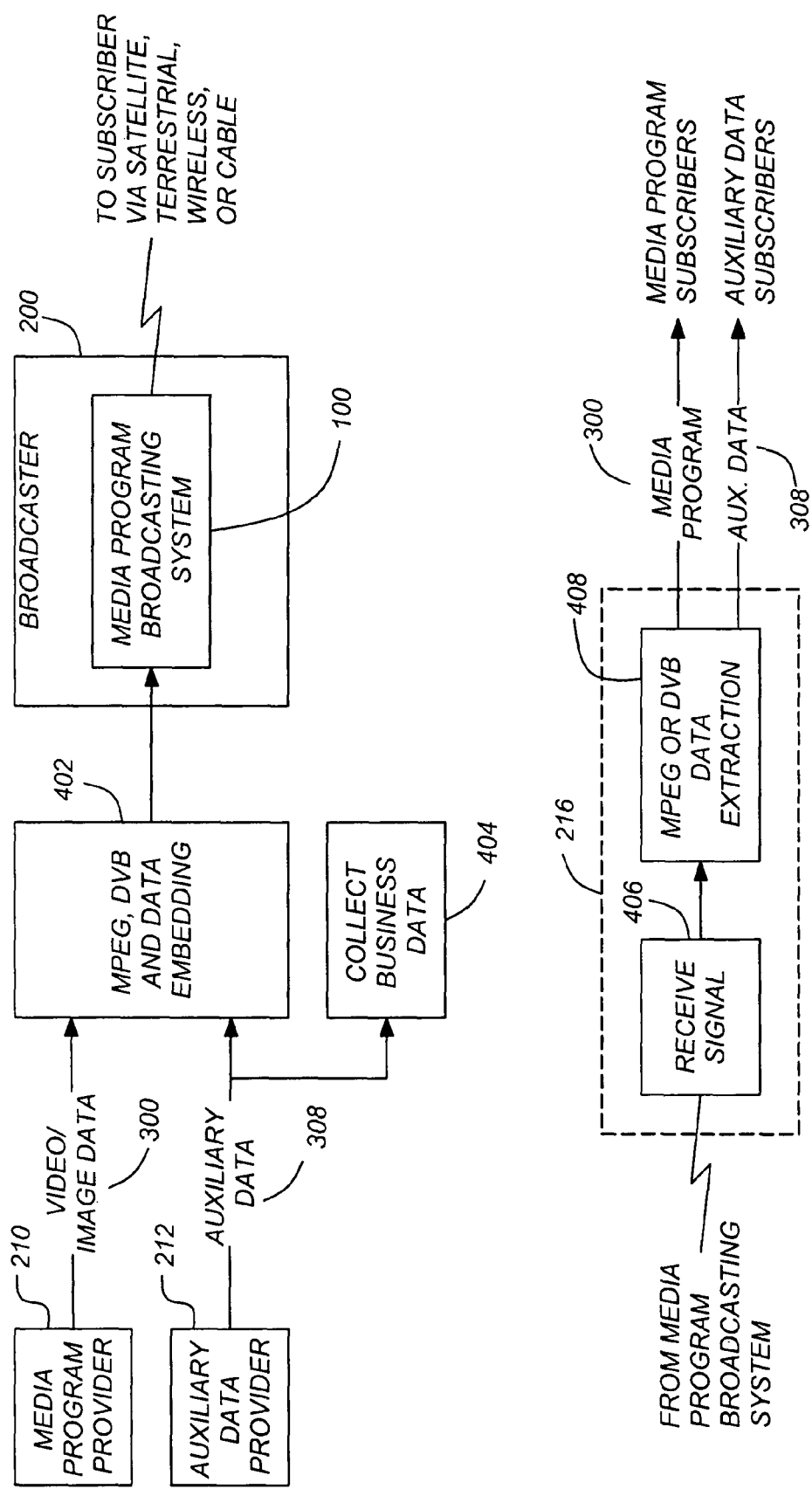
FIG. 4 is a diagram showing how the present invention can be used to embed data into a video media program.

FIG. 4 is a diagram showing how the present invention can be used to embed data into a video media program. Nominally, two input data streams, are provided. The first is a video, or media program 300 data stream from the media program provider 210 or the broadcaster 200. The second is an auxiliary data 308 stream from the auxiliary data provider 212. The ultimate source of the auxiliary data 308 can be an archival service provider or an unrelated third party. The data is embedded in the video stream, as shown in block 402. Statistics are collected for billing, as shown in block 404. This can occur before, after, or while the data is being embedded. In one embodiment, this is accomplished by collecting and using information including the number of characters in the auxiliary data 308, and usage data. The usage data can include the time at which the auxiliary data will be sent, the time the transmission is completed, the volume of the auxiliary data in bits, the identity of the auxiliary data provider, the identity of the media program provider, the identity of the broadcaster and/or other broadcaster information such as available transmission bandwidth, and the latency time between the time the data request was received for transmitting embedded data, and when the data transmission is complete. Usage time is useful in the establishment temporally sensitive of pricing programs (e.g. decreasing data transmission prices during non-business hours). Statistical data thus collected can be forwarded to a billing office within the EDBS 202 and thereafter transmitted to the client.

The data is then sent to the media broadcasting system 100 for transmission. The transmit medium may be a satellite, wireless, terrestrial, airborne, stratospheric, over-the air, or fiber or copper cable.

From the transport medium, satellite, wireless, fiber or copper cable, the broadcast is sent to the receiver 216. If only the media program 300 is to be provided to the user, the receiver 216 may be an ordinary receiver. However, if the user is to receive the embedded data, the receiver 216 comprises an embedded data decoder 216 to decode the embedded data for presentation to the embedded data subscribers via a computer, data storage device or, in some cases, a banner on the video screen.

Figure 5:
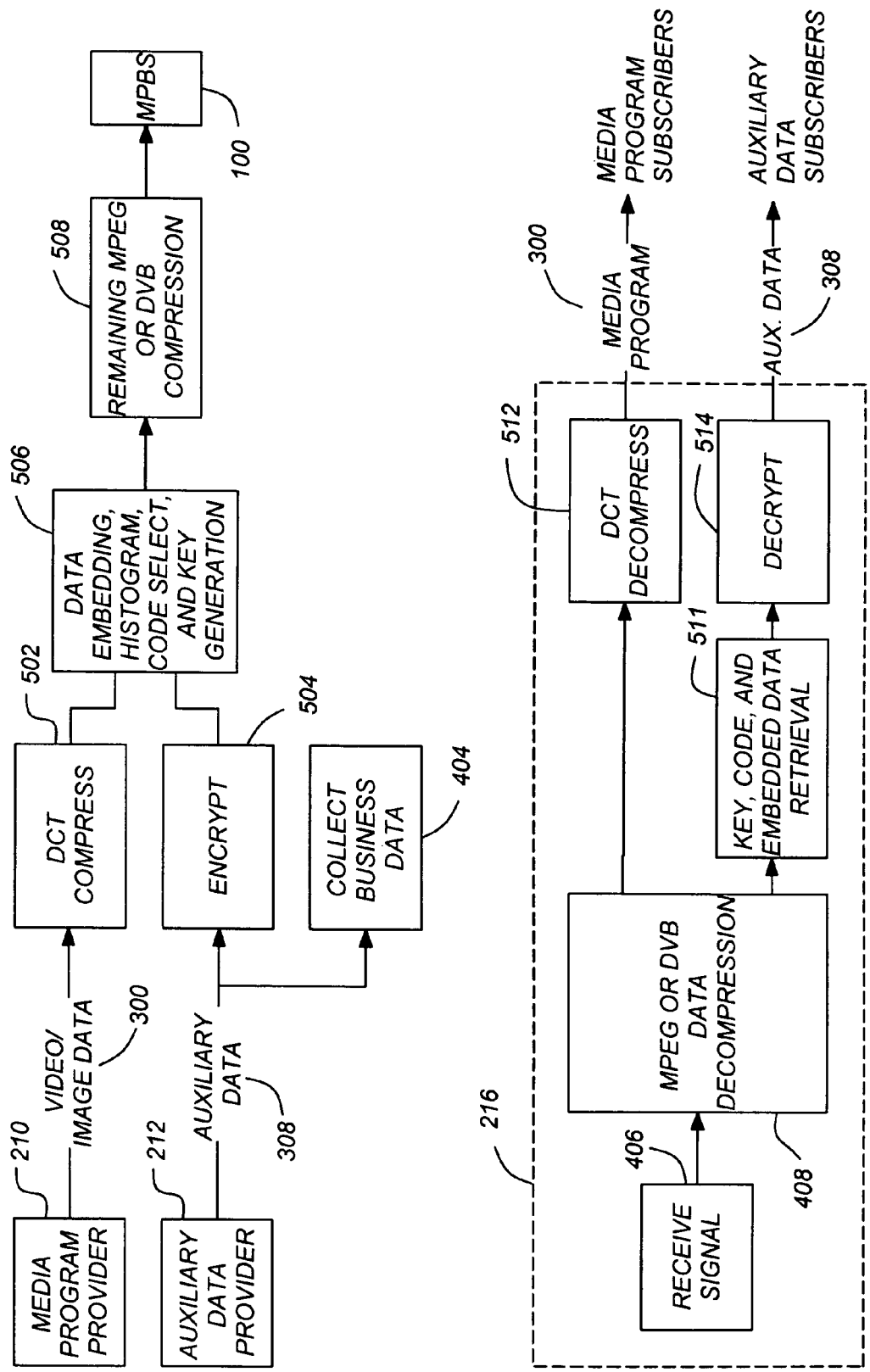
FIG. 5 is a diagram showing further details of the data embedding process.

FIG. 5 is a diagram showing further details of the data embedding process. A media program 300 such as a video (series of images such as a movie, a football game or talking heads) is provided by a user of the broadband broadcast service. The user could be, for example, a TV broadcaster, or a media program provider 210 such as HBO, AMC, ESPN. An auxiliary data provider 212 provides a digital data stream that is to be broadcast to users. This data could be digitized music, reports, textbooks, manuals, financial information, text and training materials, processes and regulations, and links to Internet. If desired, the auxiliary data may be encrypted, as shown in block 504. Encryption does not impact the data sent nor the image received. The first step in broadcasting video data is called a discrete cosine transform (DCT). The first step in video compression takes place on a single frame. At this point the compression is the same as it is for a still picture. The DCT process is "lossy," in that the picture has been at least somewhat corrupted. The least significant bits that have been lost here will not be recoverable. The color has been reduced from 16 or more bits to 8 bits. After the DCT, the DCT data is histogrammed.

The digital broadcast data has an "alphabet." The alphabet may be ones and zeros or it may be any alphabet. The less lively the video image, the smaller the number of characters may be used in the embedding alphabet. In any case, the output from the DCT is histogrammed and the most common 8 bit combinations become the alphabet. The relationship of the alphabet and the DCT elements becomes the "key" for the compression in that frame. The key is selected and the auxiliary data stream is embedded in the media program 300 according to the selected key, as shown in block 506.

Occasionally, a pixel is moved in order to embed the data in the proper order. The data embedding algorithm preserves entropy in the image. Thus, any changes made in the image are difficult if not impossible to see.

After the DCT and data embedding, the remaining MPEG or DVB compression is completed including the parallel channels of information and audio signals, as shown in block 508. The data is then transmitted.

The data is received at the user terminal's receiver 216, as shown in bock 406. MPEG or DVB decompression is performed, as shown in block 408 and the image data and the other streams of data (audio and other information) are separated. The DCT decompression process is then applied to produce the media program 300, as shown in block 512. The video data (with the data still embedded in it) goes to the traditional set top box for merging of the audio and video signals. A viewer of the video signal is not aware that any data has been embedded in the signal. It has the same high quality that he is used to from his service provider.

If the user has a specialized receiver, the auxiliary data is retrieved from the video data. This is accomplished by reading the key (from the S-frame or corner pixel(s) of the video frame) and using the key to decode and extract the auxiliary data from the video stream, as shown in block 511. The key permits the determination of ordered code alphabet cosines for the data that was transmitted. Hence, reception of the auxiliary data using the key does not significantly add to data transport time.

If the data was encrypted 504, the data is decrypted (as shown in block 514 and sent to a storage device, a computer, a FAX machine or a digital music or audio player. Typically, the auxiliary data is not very large data blocks (needing a broadband broadcast channel), but an application in which a small amount of data is sent to thousands of users. For example, the auxiliary data may comprise a single FAX to be sent to millions of subscribers at a small fraction of the cost of making a million phone calls. The cost to subscribers, broadcasters, media providers, or auxiliary data providers (or any combination thereof) is determined with statistics on number of bits, time of day, broadcaster, auxiliary data provider, is determined by the EDBS 202.

Figure 6:
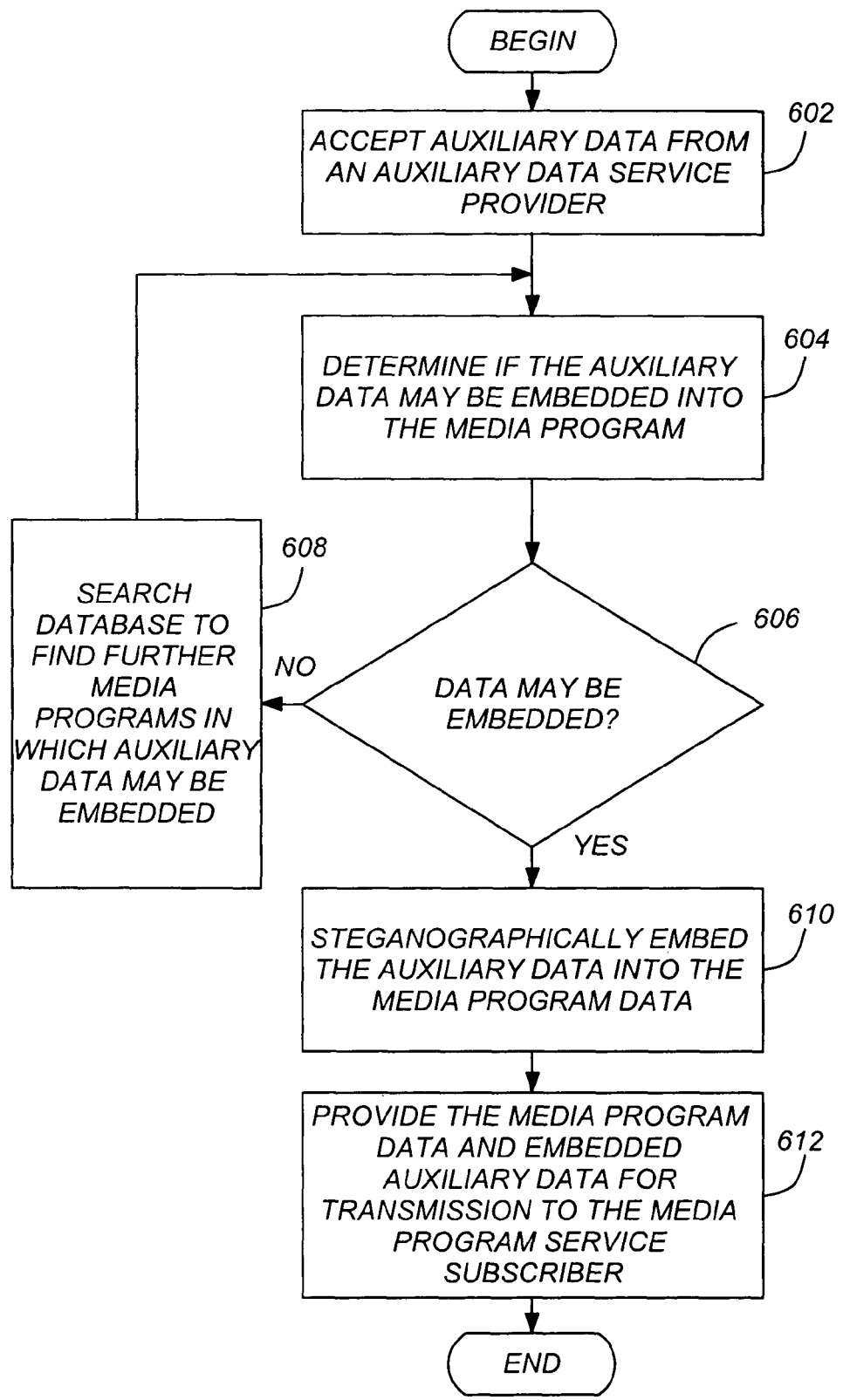
FIG. 6 is a diagram illustrating exemplary method steps used to practice one embodiment of the present invention.

FIG. 6 is a diagram illustrating exemplary method steps used to practice one embodiment of the present invention. Auxiliary data 308 is accepted from an auxiliary data service provider 212, as shown in block 602. A determination is made if the auxiliary data 308 may be embedded into the media program 300, as shown in block 604. This determination can be made using the media program 300, the terms and conditions for use of the media program 302, a description of the media program 304, the auxiliary data itself 308, the terms and conditions for use of the auxiliary data 310, an auxiliary data description, and a broadcast schedule 306, and any combination thereof. If data may be embedded 606, the auxiliary data is steganographically embedded 610 into the media program 300 data, and the media program data and embedded auxiliary data are provided 612 for transmission to the program service subscriber. This is shown in blocks 606-612. If the auxiliary data 308 may not be embedded, a database is searched (as shown in block 608) to find further media programs in which auxiliary data may be embedded, and processing returns to block 604.

Figure 7:
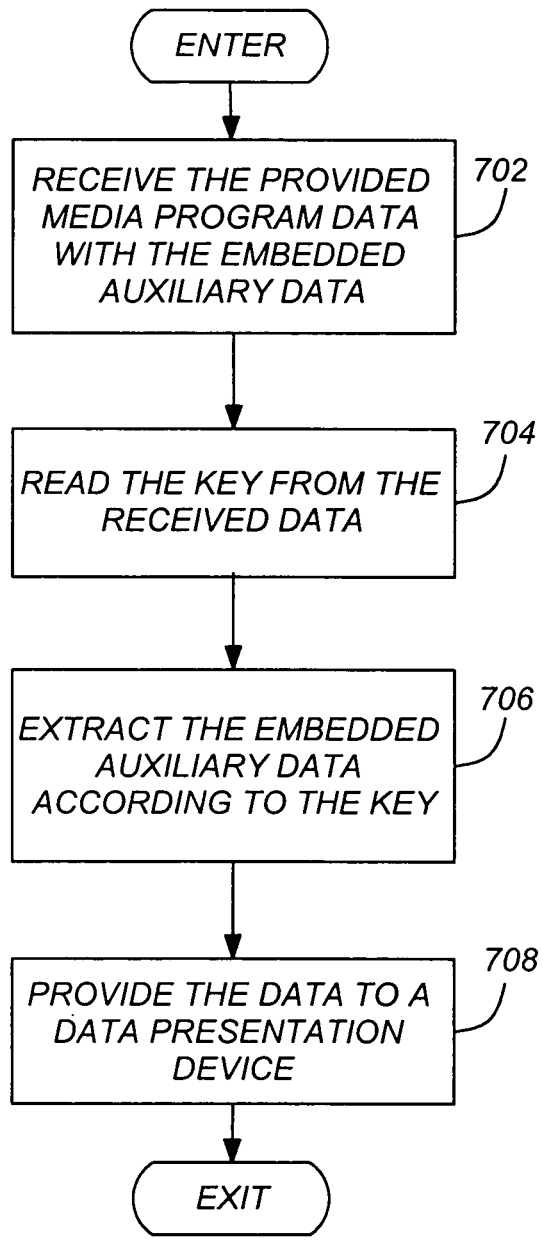
FIG. 7 is a diagram illustrating exemplary method steps used to receive the data sent using the methods described in FIG. 6.

FIG. 7 is a diagram illustrating exemplary method steps used to receive the data sent using the method described in FIG. 6. The provided media program data embedded with the auxiliary data is received, as shown in block 702. The key is then read from the received data as shown in block 704, and the embedded data is extracted according to the key, as shown in block 706. Then, the auxiliary data is provided to a data presentation device such as a television, computer, or audio reproduction system, as shown in block 708.

Figure 8:
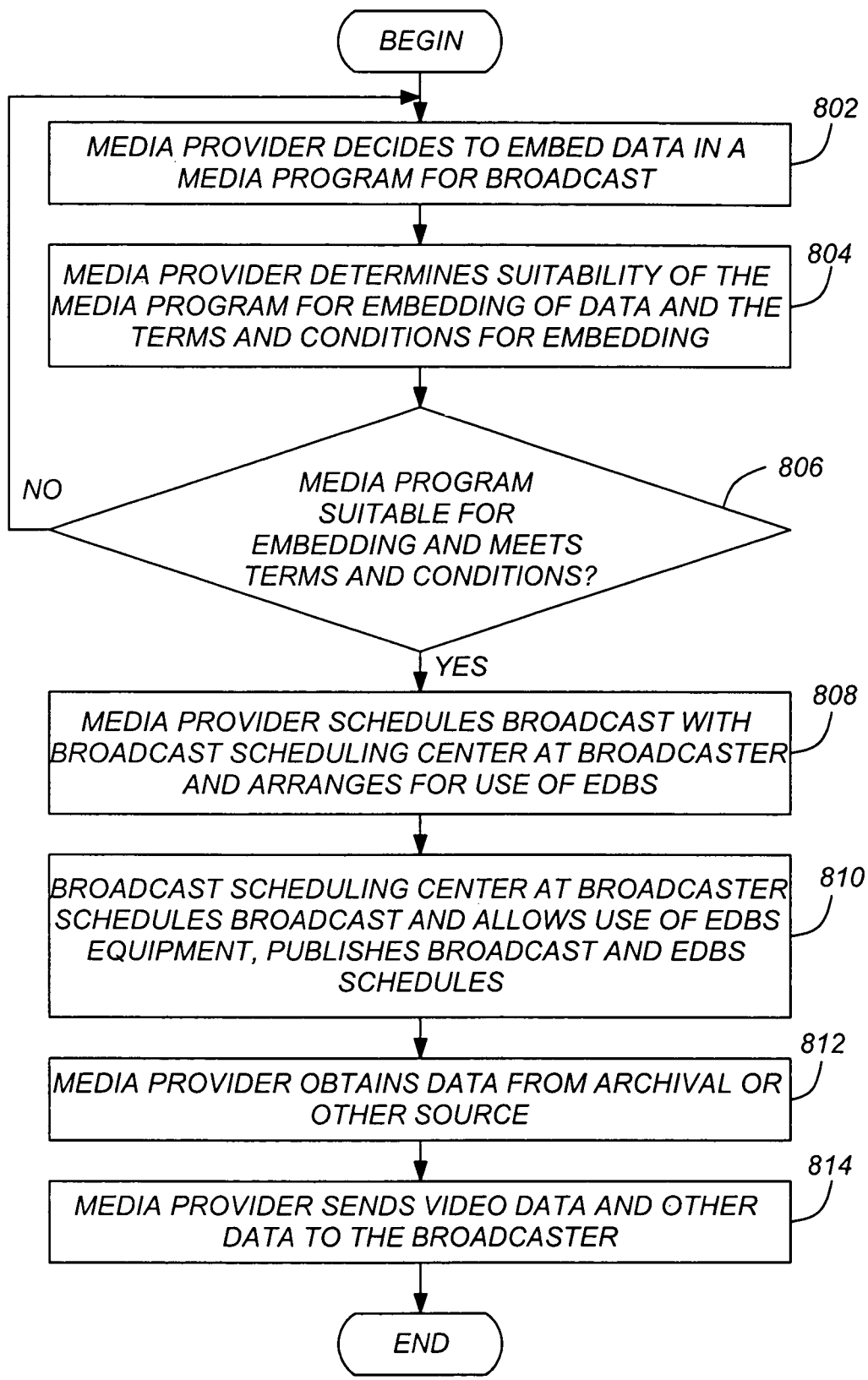
FIG. 8 is a diagram illustrating exemplary method steps for a media program provider using the Embedded Data Brokering System (EDBS)

FIG. 8 is a diagram illustrating exemplary method steps for a media program provider 210 using the EDBS 202. A media program provider 210 decides to embed data in one of their media programs, as shown in block 802. This data may be related to the media program itself, to be shown, on screen, in a banner or a box when the media program is broadcast or it may have been separately negotiated with an auxiliary data provider seeking to transmit auxiliary data unrelated to the media program or a user of broadcast services. The media program provider 210 determines the suitability of the scheduled video broadcast for embedding and the terms and conditions of the agreement with the EDBS 202 provider, as shown in block 804. One possible term and/or condition is permission or a license from the entity having the rights to the embedded data brokering system 202.

If the video is suitable for embedding, as shown in block 806 (that is, it is lively and has lots of changes) and the terms and conditions of the agreement are not favorable, then the broadcaster 200 may select another media program 210 in concert with the broadcast scheduling system 208 to find a video that is suitable, broadcast at a reasonable time and under favorable terms and conditions. This process allows the media provider 210 to ensure high quality video broadcasts. The time a video and its embedded data are broadcast may also be critical to either the broadcaster or the user of the broadcast services.

If the video is suitable for data embedding, the media provider 210 arranges with the EDBS 202 (and in particular, the broadcast scheduling system 208) to schedule the broadcast of the media program 300 and the use of the data embedding software and hardware in the EDBS 202, as shown in block 808. Both the media program provider 210 and the broadcast management system 206 of the EDBS 202 must agree to the embedding process under the terms and conditions described above.

The broadcast management system 206 schedules the use of the EDBS 202 equipment, as shown in block 810. It also follows the schedules 306 obtained from the broadcaster 200 and or the media program provider 210 for broadcasting. The media program provider 210 may use more than one broadcaster 200. For example, HBO is broadcast by satellite service providers such as DIRECTV, and cable networks. The schedule for the broadcast media program 210 with embedded data is disseminated by electronic publishing or other means. Suitable security can be provided to assure that the broadcast schedule for the auxiliary data 308 embedded in the media program 300 is not published to persons who do not have permission to receive the data or view the broadcast schedule. In one embodiment, the published schedules are made available in publishing media like TV GUIDE and/or ON SCREEN. For some applications, (i.e. embedding statistics and other information in a basketball game media program), the schedule need not be published, because the auxiliary data is provided to enhance the experience of the game.

When the broadcast has been scheduled, the broadcaster obtains the video data and the data to be embedded to the broadcast management center, as shown in block 812. The data may be embedded into the video as it is broadcast or it may be embedded a priori. Either way, the data is embedded in the media program 300 and ready for broadcast. The media program with the embedded auxiliary data is transmitted to the broadcaster 200 for broadcasting, as shown in block 814.

Figure 9:
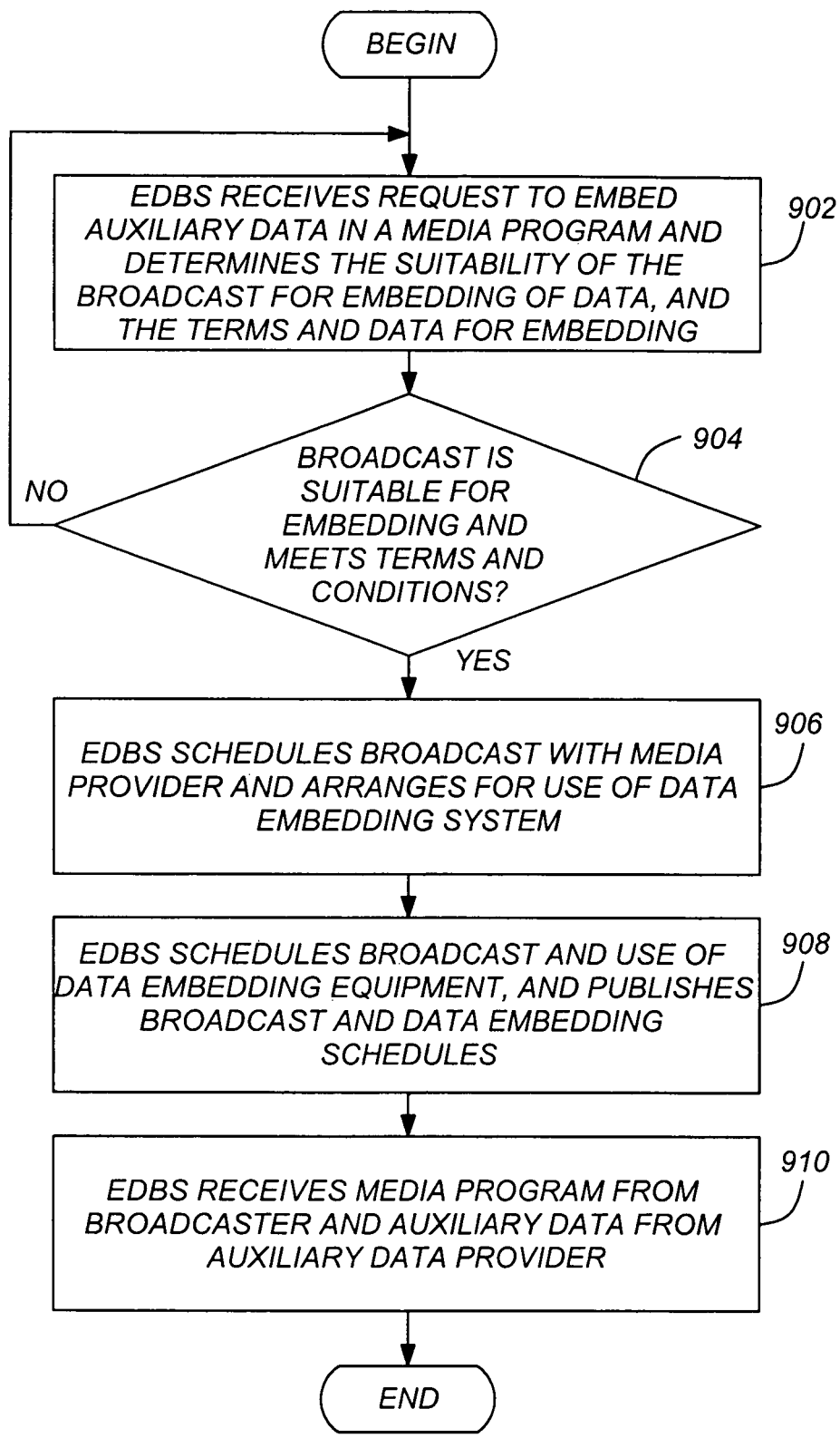
FIG. 9 is a flow chart presenting an alternative business operation model.

FIG. 9 shows another business operational model. In this case, the broadcast management system 206 of the EDBS 202 has received a request from an auxiliary data provider 212 to embed auxiliary data 308 into a media program 300, as shown in block 902. A determination is made regarding the suitability of the media program 300 for the embedding of auxiliary data 308. This can include a determination of whether the media program 300 is lively enough to be suitable for auxiliary data embedding and a determination regarding whether such embedding meets required terms and/or conditions.

If the media program is suitable for the embedding of auxiliary data, the broadcast management system negotiates with the media program provider 210 for the use of the media program 300 for data embedding. If the media provider 210 provides a broadcast-ready feed of the media program 300, then the broadcast management system arranges for auxiliary data 308 embedding before the media program is to be broadcast. The equipment for data embedding includes the data embedding system 204 at the EDBS 202. This equipment may also be available directly to the media provider or at the media provider's facility under license.

The EDBS 202 schedules the broadcast of the media program with the media provider 210, and arranges for the use of the data embedding system 204 (block 906). If the broadcast schedules are to be published, the broadcast schedules for the media program 300 and the auxiliary data 308 are transmitted to media program subscribers and auxiliary data subscribers. If the broadcast schedule is not to be published, the time of the broadcast must be distributed to the users. In one embodiment, this is the responsibility of the auxiliary data provider 212. The broadcast management system 206 gives the schedule to the auxiliary data provider 212. It is important that the schedule be available to the intended receivers of the auxiliary data, so that auxiliary equipment is turned on to receive the data.

The media program 300 data is received at the broadcast management system from the media program with the data embedded or it is embedded in real time before broadcast of the media program. This is illustrated in block 910. The embedding process adds very little latency to the broadcast (typically less than a tenth of a second). Latency in a embedding auxiliary data in media programs for distribution by satellite are not noticeable by the subscriber.

Figure 10:
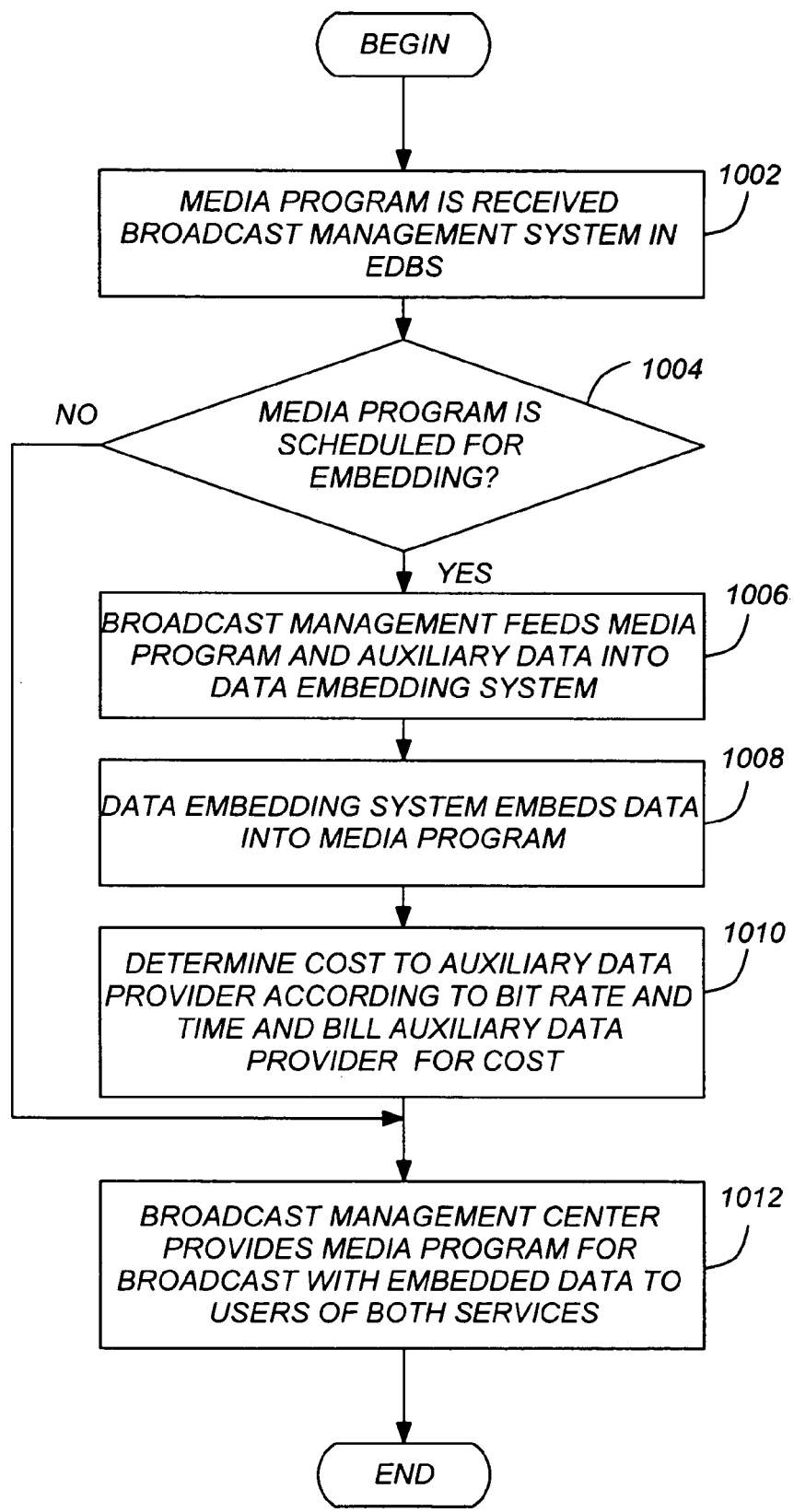
FIG. 10 is a diagram showing the steps that are performed at the EDBS.

FIG. 10 is a diagram showing the steps that are performed at the EDBS 202. When a media program 300 is received at the broadcast management system 206, a determination is made whether or not EDBS data embedding is to be applied. This is shown in blocks 1002 and 1004. If data is to be embedded, the auxiliary data and the media program 300 is fed into the data embedding system 204 (modified MPEG or DVB) equipment ready for broadcast.

The data embedding system 204 embeds the data into the media program 300. At the same time, the billing for providing the embedding service is determined by the bit rate and time. This data is sent to a billing department at the broadcast management system 206. This is shown in blocks 1006-1010.

In either case, whether the auxiliary data is embedded into the media programs at the broadcast center or at the media provider's facilities, the broadcast management system provides the media program 300 with the embedded data to a broadcaster 200 to be transmitted to both the subscribers of the video service and the subscribers to the auxiliary data service.

At the subscriber 112, the reception of embedded auxiliary data requires a specialized receiver 216 to extract the embedded data. However, the embedded data does not affect existing subscriber receivers and does not affect video quality.

Figure 11:
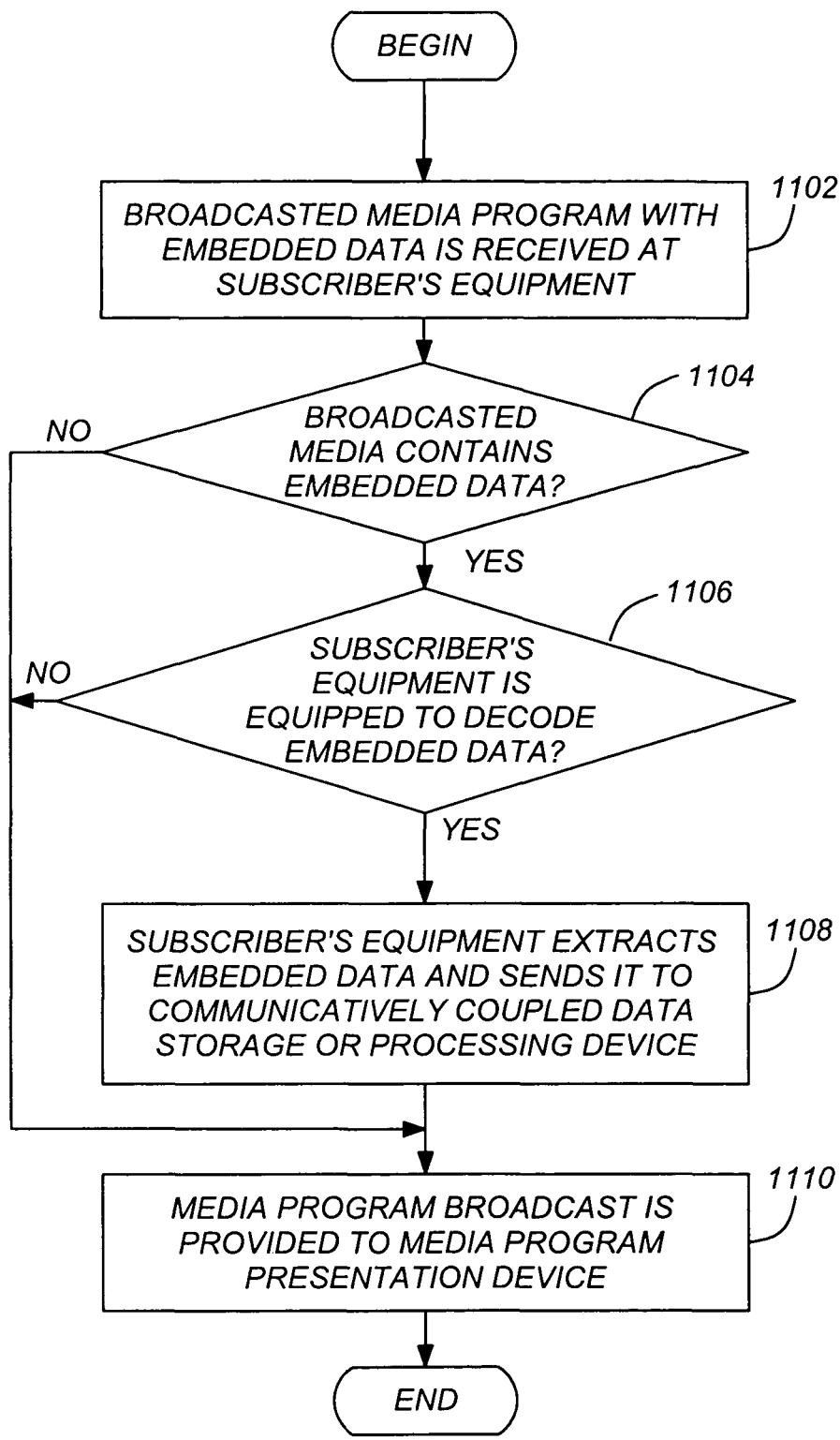
FIG. 11 is a flow chart showing the process steps taking place at the subscriber location.

FIG. 11 is a flow chart illustrating the process steps taking place at the subscriber 112. A media program 300 broadcast is received (block 1102) at a subscriber's receiver 216. The transmission media for the broadcast itself does not matter. It may be satellite, wireless, copper or fiber cable.

The broadcast may or may not contain embedded data. In one embodiment, this is determined (block 1104) via an identifying code in the MPEG or DVB data frame. If there is no embedded data, processing passes to block 1110 where MPEG or DVB processing is completed without removing the embedded data. Lossy compression in MPEG or DVB means that the image has already altered. The embedding of the data may alter it further, but maintains an equivalent level of loss of quality. In other words, entropy is preserved.

If the data is present but the subscriber is not authorized to receive embedded data then only ordinary media program processing (i.e. MPEG processing) takes place (block 1110). If embedded data is present and the subscriber is authorized to receive the data, it is extracted (block 1108) in by the subscriber's equipment (typically in real time or near real time) and sent to data storage or processing equipment such as a data presentation device.

If the user is also receiving the media program and the media program is a video, the video is uncompressed and displayed on a TV or other presentation device. If the subscriber's receiver 214 has no data embedding extraction capability, or the subscriber 112 is not authorized to receive the auxiliary data, only the uncompressed (by MPEG or DVB) video is available to be displayed on a TV set.

Receiving embedded data is logically equivalent to "pay per view." The broadcast center provider does not enable a subscriber's receiver equipment if he is not authorized to receive the data, either because he has not paid to receive it or because the sender of the data has not authorized him to receive it. This is accomplished via the same systems and methods that are currently used to enforce "pay per view" viewing in digital satellite video broadcasts. "Pay per view" is a service provided by broadcasters such as DIRECTV. The subscriber calls and requests access to a particular media program. If access is granted, the subscriber's receiver 214 is activated to receive the media program, and the subscriber is billed for the service. The difference in the foregoing case is that the primary source for permission is the data provider rather than the subscriber.

CONCLUSION

The present invention describes a method and apparatus for brokering data embedding services. The method comprises the steps of receiving a request in an embedded data brokering system to embed the auxiliary data in the media program, determining if the auxiliary data may be embedded into the media program, negotiating a schedule for broadcasting the media program with embedded auxiliary data with the media program provider, transmitting the negotiated schedule for broadcasting the media program with the embedded auxiliary data to the media program provider, steganographically embedding the auxiliary data in the media program while collecting billing information regarding the embedded data, and providing the media program and the embedded auxiliary data to the media program services subscriber for broadcast according to the broadcast schedule.

The apparatus comprises a system for transmitting auxiliary data embedded into a media program to at least one media program service subscriber. The apparatus comprises a data embedding system, for accepting the auxiliary data provided by an auxiliary data provider and for steganographically embedding the auxiliary data into the media program data, a broadcast management system, communicatively coupled to the data embedding system for commanding the data embedding system to steganographically embed the auxiliary data into the media program data, and for collecting billing information regarding the embedded auxiliary data, a broadcast scheduling system, communicatively coupled to the broadcast management system and the data embedding system, for maintaining media program broadcast schedules from media broadcast service providers, for scheduling when the auxiliary data is to be transmitted with the media program data, and for determining when the auxiliary data may be embedded into the media program data.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of brokering the transmission of auxiliary data in a media program from a broadcaster to at least one media program service subscriber, comprising the steps of:
   accepting a requested scheduling of a broadcast of the media program with steganographically embedded auxiliary data from a media provider in an embedded data brokering system, wherein the media provider has predetermined the suitability of the media program for embedding auxiliary data;
   scheduling the broadcast of the media program with the steganographically embedded auxiliary data;
   transmitting the broadcast schedule from the embedded data brokering system to the media provider;
   receiving the media program from the media provider in the embedded data brokering system;
   steganographically embedding the auxiliary data in the media program while collecting billing information regarding the steganographically embedded auxiliary data;
   providing the media program and the steganographically embedded auxiliary data for broadcast according to the broadcast schedule;
   searching a database to find further media programs in which auxiliary data may be embedded if the auxiliary data may not be embedded in the media program.

2. The method of claim 1, wherein the auxiliary data is provided to the embedded data brokering system by an auxiliary data service provider and the method further comprises the steps of:
   generating an invoice for embedding the auxiliary data in the media program using the collected billing information; and
   transmitting the generated invoice to the auxiliary data service provider.

3. The method of claim 1, further comprising the steps of:
   generating an invoice for embedding the auxiliary data in the media program using the collected billing information; and
   transmitting the generated invoice to the media program service subscriber.

4. The method of claim 1, wherein the billing information comprises at least one of:
   a character count of the auxiliary data;
   an identity of the auxiliary data provider;
   an identity of the media program data provider;
   a time describing when the media program and embedded auxiliary data is transmitted to the media program service subscriber;
   a time interval over which the media program and embedded auxiliary data is transmitted to the media program services subscriber; and
   a quality of service parameter for the transmission of the media program and embedded auxiliary data to the media program services subscriber.

5. The method of claim 1, wherein the auxiliary data is steganographically embedded into the media program data only according to a set of auxiliary data embedding conditions.

6. The method of claim 5, wherein the set of auxiliary data embedding conditions comprises at least one of:
   an indication of whether the auxiliary data is permitted to be embedded and transmitted under any circumstances;
   time intervals during which auxiliary data embedded into the media program data may be transmitted; and
   an identification of the media program data that the auxiliary data is permitted to be embedded into;
   an indication of whether any auxiliary data is permitted to be embedded into the media program data; and
   an identification of the auxiliary data that is permitted to be embedded and transmitted with the media program data.

7. The method of claim 1, wherein the media program comprises video data coded by a data compression technique, and the step of steganographically embedding the auxiliary data into the media program comprises the steps of:
   steganographically embedding the auxiliary data into the media program according to a key;
   coding the media program; and
   storing the key in an unused data block of the coded media program.

8. The method of claim 1, wherein the media program comprises video data coded by a data compression technique, the coded video data describing a video frame having a plurality of pixels, and the step of steganographically embedding the auxiliary data into the media program comprises the steps of:
   steganographically embedding the auxiliary data into the media program according to a key; and
   storing the key in at least one corner pixel of the video frame.

9. The method of claim 1, wherein the auxiliary data is related to the media program.

10. The method of claim 1, further comprising the steps of:
    receiving the transmitted media program with the embedded auxiliary data;
    extracting the embedded data; and
    providing the data to a data presentation device.

11. The method of claim 10, wherein the step of extracting the embedded data comprises the steps of:
    reading the key; and
    extracting the embedded auxiliary data according to the key.

12. The method of claim 11, wherein received media program comprises data coded according to a data compression technique, and the key is read from an additional unused data block of the media program.

13. The method of claim 11, wherein the media program comprises MPEG-coded video data describing a video frame having a plurality of pixels key is read from at least one corner pixel of the video frame.

14. The method of claim 1, further comprising the step of storing the media program and embedded auxiliary data for subsequent broadcast to the media program service subscriber.

15. The method of claim 1, wherein the embedded data brokering system comprises a broadcast management system, communicatively coupled to a broadcast scheduling system and a data embedding system, wherein:
  the broadcast management system accepts the requested scheduling of the broadcast of the media program with steganographically embedded auxiliary data from the media provider, transmits the broadcast schedule from the embedded data brokering system to the media provider, receives the media program from the media provider, and provides the media program and the steganographically embedded auxiliary data for broadcast according to the broadcast schedule;
  the broadcast scheduling system generates the broadcast schedule for the broadcast of the media program with the steganographically embedded auxiliary data; and
  the data embedding system steganographically embeds the auxiliary data in the media program while collecting billing information regarding the steganographically embedded auxiliary data.

* * * * *